Figure 1:
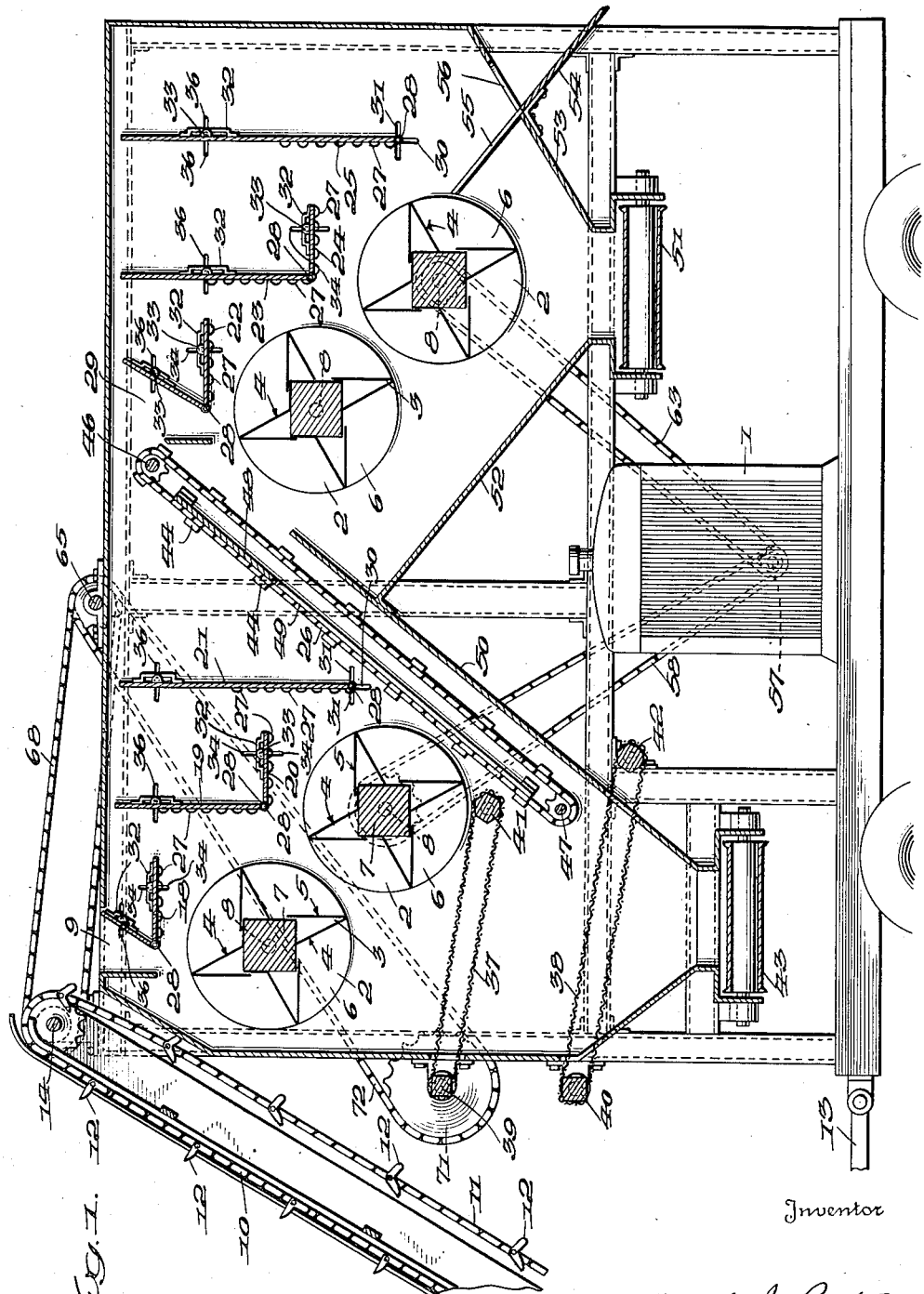

June 22, 1937.  F. J. BOTT  2,084,935
VINER
Filed Feb. 15, 1937     5 Sheets-Sheet 2

Inventor
Francis J. Bott
By Ritter, Machlin, O'Neill & Muir
His Attorneys

June 22, 1937.  F. J. BOTT  2,084,935
VINER
Filed Feb. 15, 1937   5 Sheets-Sheet 3
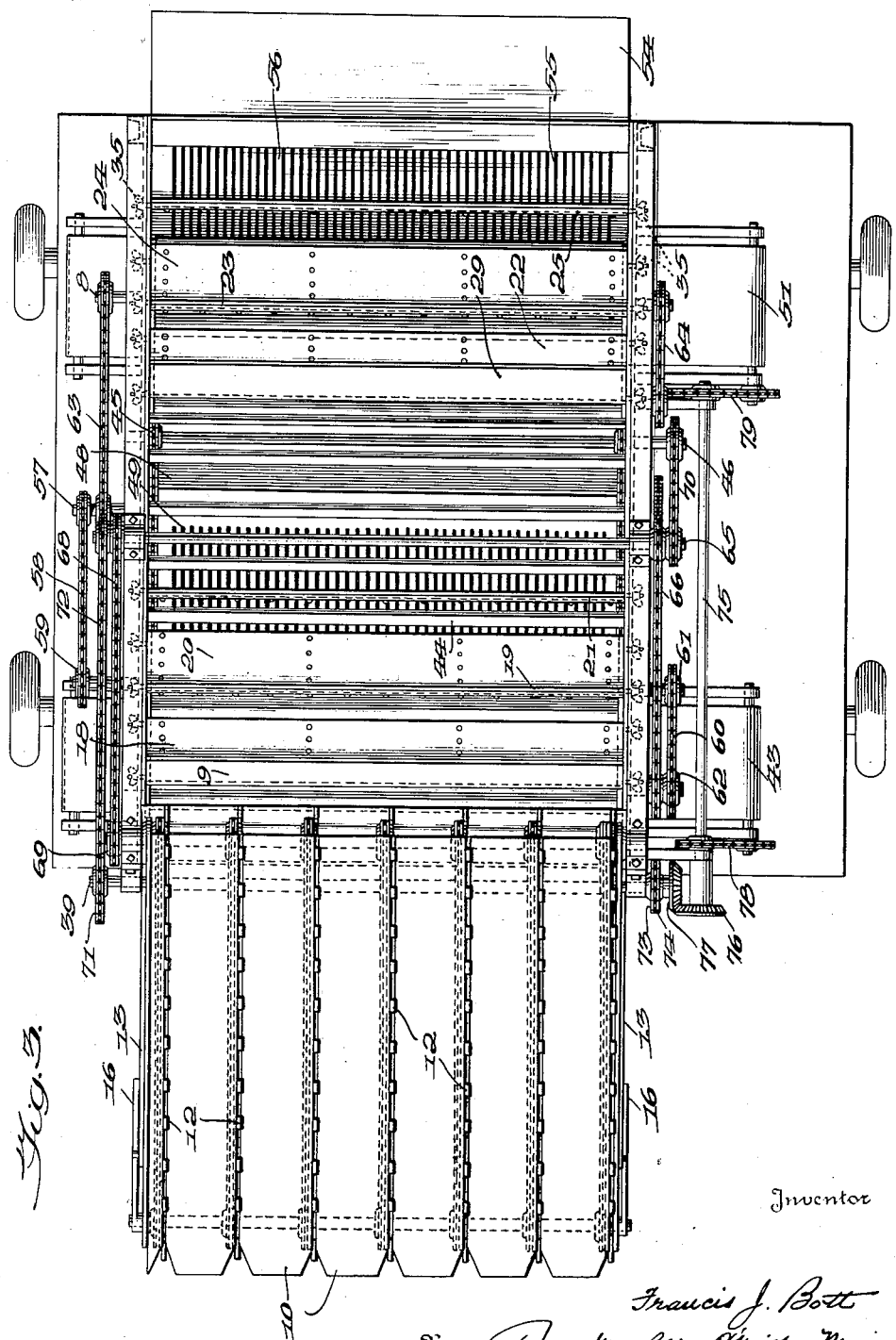

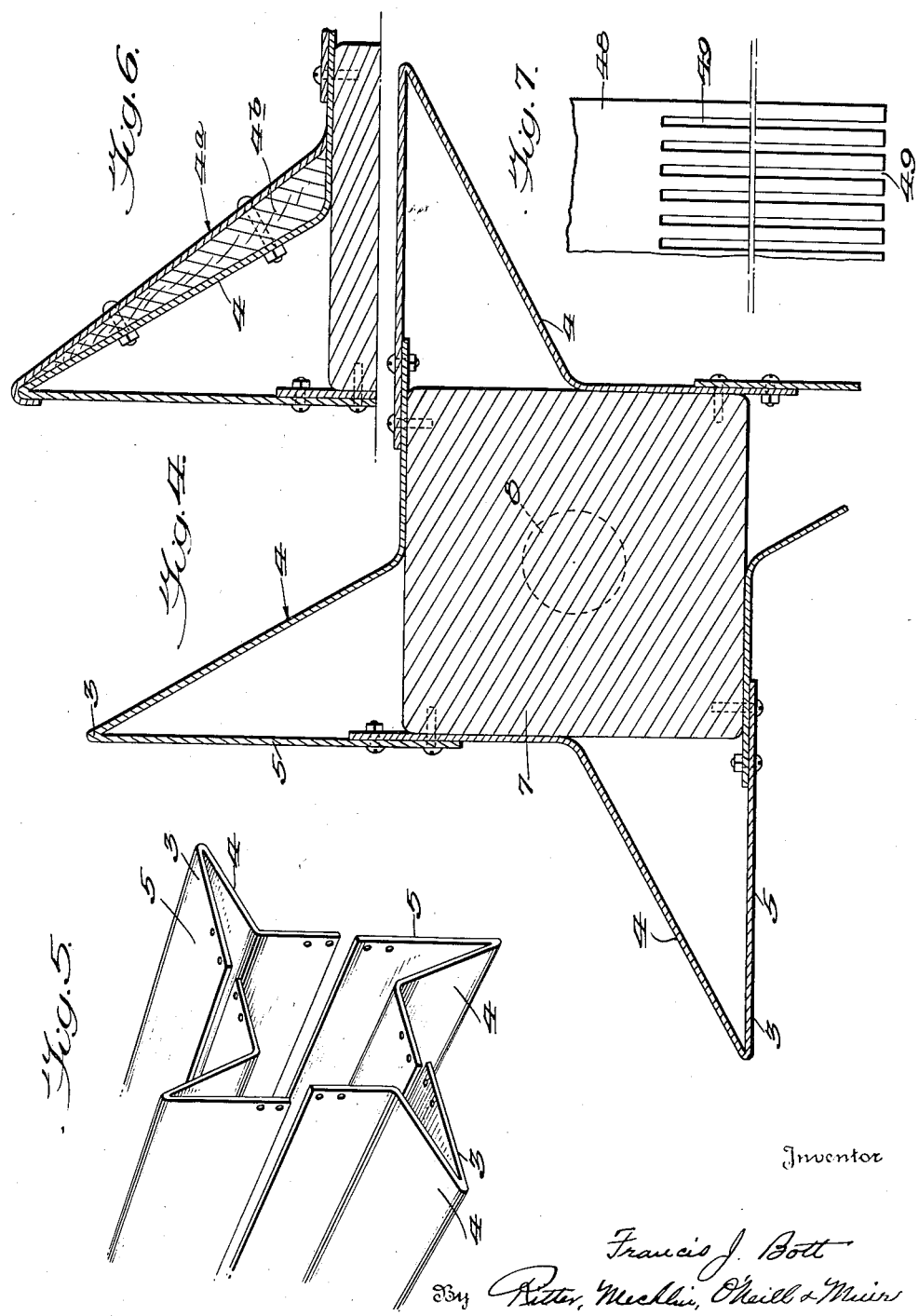

June 22, 1937.  F. J. BOTT  2,084,935
VINER
Filed Feb. 15, 1937   5 Sheets-Sheet 5

Inventor
Francis J. Bott
By Ritter, Mechlin, O'Neill & Muir
his Attorneys

Patented June 22, 1937

2,084,935

UNITED STATES PATENT OFFICE 2,084,935

VINER

Francis J. Bott, Seattle, Wash.

Application February 15, 1937, Serial No. 125,862

9 Claims. (Cl. 130—30)

This invention relates to machines, commonly known as viners, for threshing peas or beans from the vines to which their pods are attached.

The object of the invention is to provide a viner which will yield a high percentage of the peas or beans with a minimum splitting or bruising thereof.

Viners now most commonly used for threshing peas or beans employ the principle of repeatedly striking a relatively compact mass of vines and throwing it against a resisting surface. Such viners generally comprise a long hollow hexagonal prism, called a threshing cylinder or reel, within which is a hexagonal prism or beater cylinder that is provided on each of its faces with a series of blades or beaters. The threshing cylinder is provided at the angles between its faces with inwardly extending radial ribs, and its outer faces or sides are formed as screens through which peas may escape. The outer or threshing cylinder revolves slowly, while the beater cylinder revolves at a very much higher speed in the same direction. The vines, which are fed into the threshing reel at one end, form into rope-like masses as they pass through the apparatus. A vine mass within the threshing cylinder is carried upwardly in a circular path until it slides off the radial lifting rib by which it is supported and it then falls into the path of the beater cylinder. When the vines are struck by a beater they are immediately thrown against the outer reel and remain in contact therewith until they are subsequently carried upwardly thereby and again fall into the path of the beaters of the beater cylinder. Upon leaving a beater the mass of vines is hurled against a rib of the threshing reel with substantially the same velocity as the beater, and the pods are opened upon striking the rib. Some pods are also opened by the impact of the beater. In this type of apparatus the vines are considerably bruised, thereby losing much of their natural elasticity, and as a result it is difficult to cause an opening of pods embedded in the mass unless impacts so great as to cause many peas to be damaged are imparted to the vines. Moreover, a considerable proportion of the peas loosed from such embedded pods are trapped in the mass of bruised vines and are lost by passing out of the apparatus with said vines.

In the past peas and beans have also been threshed by apparatus designed to break and tear the vines with their attached pods into small pieces. Apparatus of this type commonly involves the use of revolving drums having radially extending intermeshing fingers between which the vines pass and by which they are broken up and the peas freed from their pods. A threshing machine operating according to this principle results in much damage to the peas.

As distinguised from the principles of operation of other pea or bean threshing apparatus, my invention contemplates rapidly flicking the vines with their attached pods so as to cause them to move in a substantially continuous stream whose course is deflected by baffle means against which the vines may impinge. A viner operating in accordance with this principle has been found to be highly efficient, the percentage of peas threshed from the vines being very high and the proportion of split or damaged peas being low.

Figure 2:
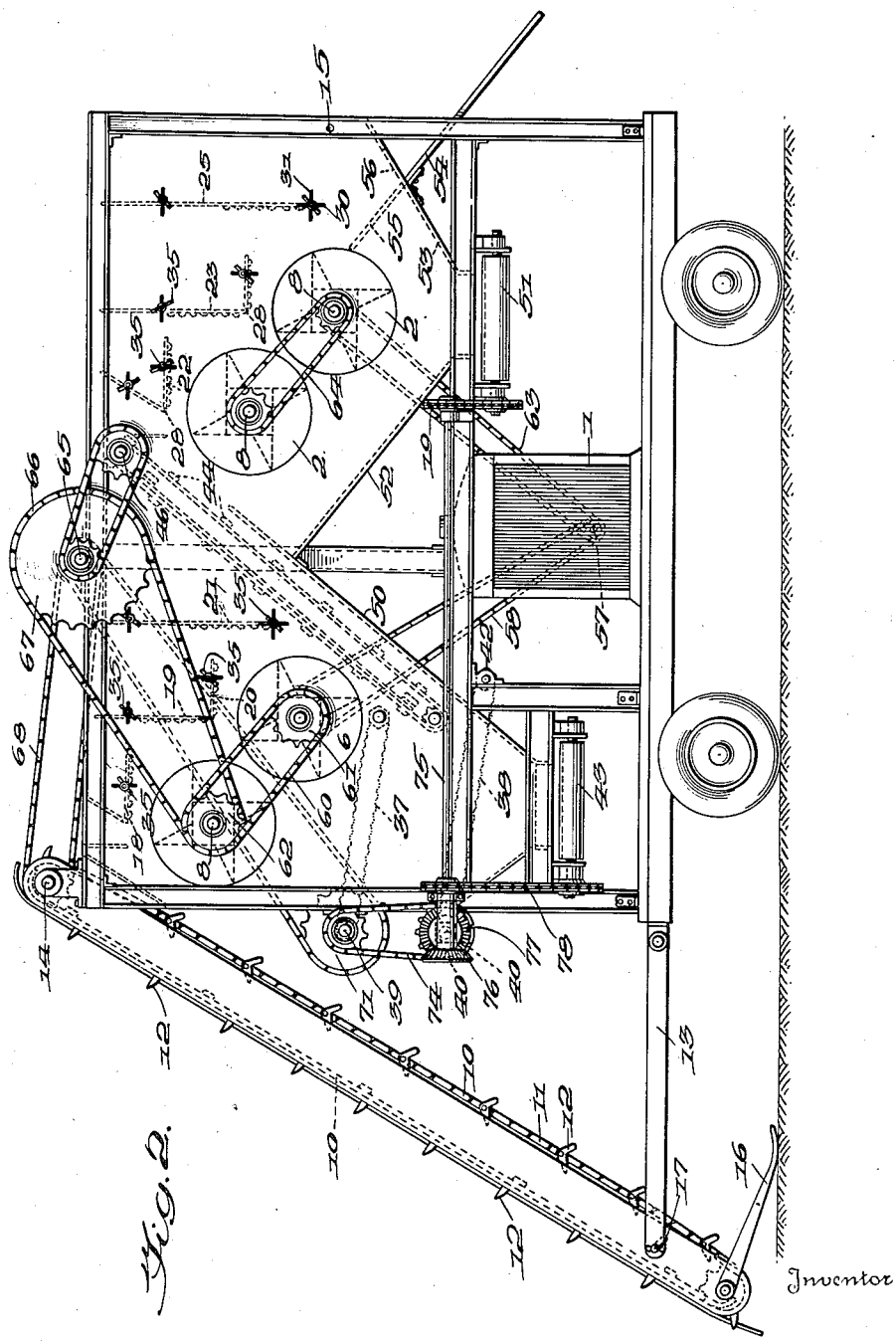
Figure 8:
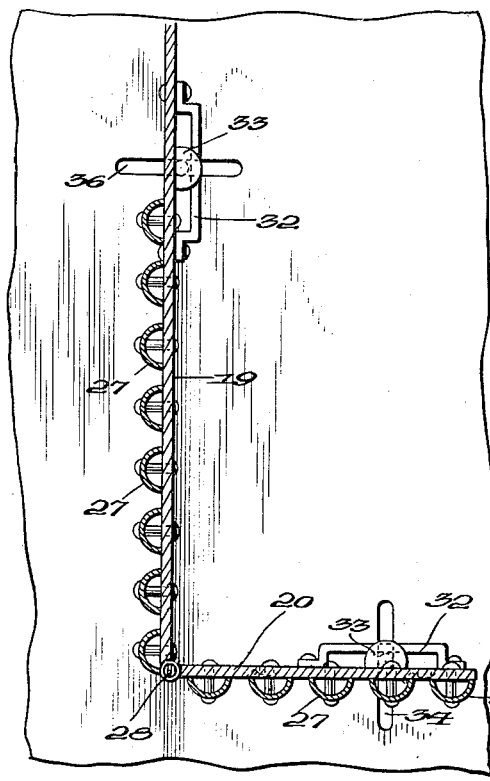
Figure 9:
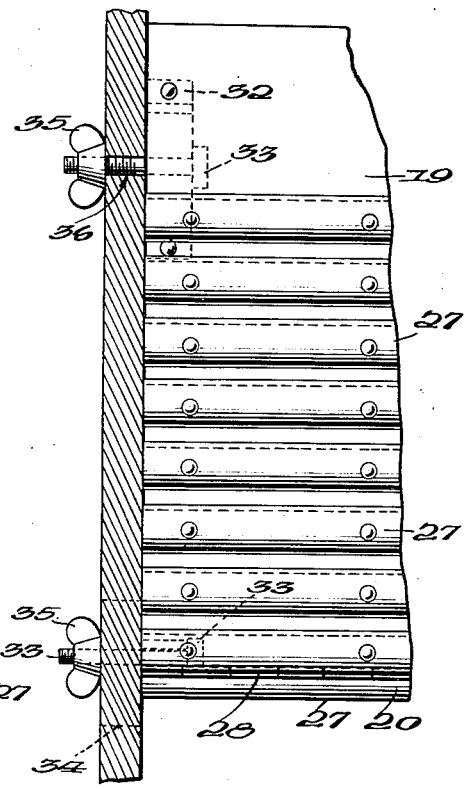
Figure 10:
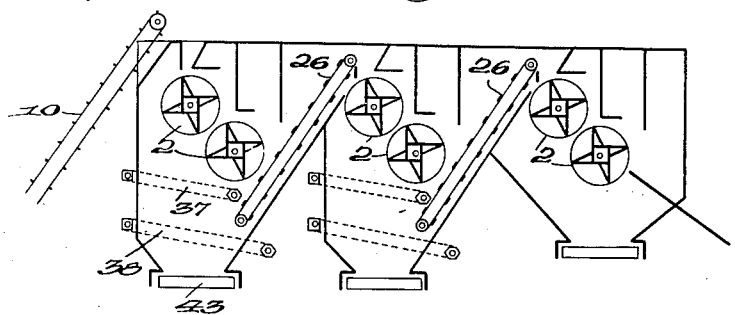

In the drawings illustrating a preferred embodiment of the invention, the scope whereof is pointed out in the claims:

Figure 1 is a view partly in side elevation and partly in vertical section showing a viner constructed in accordance with the invention, Figure 2 is a side elevational view of the apparatus, Figure 3 is a plan view of the viner, the upper portion of its housing being removed to disclose the interior mechanism, Figure 4 is a detail sectional view of one of the beater cylinders, Figure 5 is a detail perspective view showing the beater elements of the beater cylinder, Figure 6 is a detail sectional view illustrating a simple means for modifying the inclination of the impact faces of the beaters, Figure 7 is a detail plan view of a portion of the slotted board forming a part of an elevator or carrier by which vines may be transported from one to another set of beater cylinders when a plurality of sets of such cylinders are employed, Figures 8 and 9 are detail views, partly in elevation and partly in section, illustrating baffle board elements of the apparatus together with simple means for adjusting their positions, Figure 10 is a diagrammatic view illustrating the invention as applied to a viner employing three sets of beater cylinders.

The viner preferably receives the vines with their attached pods immediately upon their being mowed. To this end it is preferably provided with wheels to enable it to follow a mowing machine or, if desired, it may itself be provided with means for cutting down the vines. Power for operating the several movable elements of the apparatus is preferably supplied by an internal combustion engine 1 which is mounted upon the framework of the viner.

Within the housed upper portion of the viner are a plurality of beater cylinders 2 which are preferably arranged in sets or pairs. Four beater cylinders are usually all that are required, but if special circumstances render it desirable to employ a greater number of such cylinders an increased number may be used, as indicated in Figure 10. To attain compactness in arrangement of parts, as well as interchangeability of the beater cylinders, all of the cylinders preferably are of the same diameter and rotate in the same direction.

The beater cylinders 2 of each set are preferably disposed in substantially parallel relation and have their axes of rotation substantially horizontal, the initial cylinder being positioned so that it extends upwardly beyond the next succeeding cylinder. The adjacent cylinders are so spaced with relation to each other that the peripheral paths traced by the tips of their beaters 3 are separated radially along the line connecting their centers of rotation, thereby affording space between the cylinders of each set for the unobstructed passage of peas and beans.

The respective beater cylinders 2 of each set preferably rotate in the same direction. Each is formed with a plurality of beaters 3 which extend lengthwise of their respective cylinders for a distance coextensive with the portion of the cylinder which actively cooperates with the vines. The forward or vine impinging faces 4 of the beaters preferably incline or rake backwardly with respect to their direction of rotation; and the rear face 5 of each beater may advantageously be disposed so as to form an obtuse angle between it and the forward face 4 of the next succeeding beater, thereby minimizing the possibility of vines being trapped between successive beaters and carried circularly with the cylinder. At each end the beater cylinders 2 are provided with circular discs 6 which fill correspondingly shaped openings in the side walls of the viner housing and form guards preventing the escape of vines or peas. As shown in Figures 4 and 5 the beaters 3 may advantageously be fashioned of sheet metal and rigidly attached to a suitable central filler 7 which is provided at its opposite ends with shaft members 8.

The vines are fed downwardly to the initial cylinder of the first set of cylinders in such relation thereto that the respective beaters of said initial cylinder impinge the fed vines while rotating through an upper arc of their travel, the relationship being preferably such that the beaters meet the vines just before reaching the highest point through which they rotate. To this end the viner is preferably provided with a feed chute or hopper 9 which extends from side to side of the viner in parallel relation to the underlying beater cylinder 2, the discharge opening of the hopper being spaced upwardly from the beater cylinder and its forward edge being so positioned that the vines delivered therethrough move into the path of the beaters 4 slightly before the latter reach the uppermost point of their movement. The vines may be supplied to the feed hopper 9 in any desired manner but it is preferred to deliver them to the hopper by means of an elevator 10 which, as shown in the drawings, may conveniently be of the well known form employing sprocket driven chains 11 equipped with pivoted lugs or teeth 12 which carry the vines upwardly with them as the chains travel and which are withdrawn from the vines when the latter reach the top of the elevator.

When in use the elevator 10 by which the vines are fed is preferably maintained in operative position by pivoted bars 13 (see Figure 2) disposed at opposite sides of the apparatus. When the viner is not in use and is being transported from one place to another the bars 13 may be disconnected from the viner frame so as to permit the elevator to be rotated around its upper sprocket shaft 14 until it is supported in a substantially horizontal position on the top of the viner. It may be held securely in this position by passing bolts through the bars 13 and through suitable openings 15 provided in the viner frame for that purpose. The feed elevator is preferably provided at its lower end with a shoe 16 which extends from side to side of the elevator and follows the surface of the ground so as to accommodate the lower end of the elevator thereto, pin and slot connections, as indicated at 17 in Figure 2, being provided between the outer ends of the respective brace bars 13 and the frame of the elevator to enable the latter to move in response to the movements of the shoe 16.

The vines are preferably fed to the initial beater cylinder of each set of cylinders in the same way, there being a feed chute or hopper 29 corresponding to the chute 9 for delivering to the initial cylinder of the second set the vines which have been acted upon by the first set.

Associated with the respective beater cylinders 2 are baffle means adapted to be impinged by vines propelled from the corresponding cylinders and to deflect the course of the stream of vines passing through the apparatus, said baffle means being disposed upwardly of the plane passing through the axes of their related cylinders to thereby enable them to cooperate with vines thrown from the upper portions of the cylinders. The baffle means for each cylinder preferably embody a plurality of baffle boards or baffle surfaces disposed at an angle to each other and corresponding in length to the portion of the cylinder which acts upon the vines, the baffles associated with the initial cylinder of the first set of cylinders being indicated at 18 and 19, respectively, and those for the next succeeding beater cylinder of the first set being shown at 20 and 21, respectively, while those associated with the second set of cylinders are respectively indicated at 22, 23, 24 and 25.

The baffle 18 extends rearwardly from the lower end of the feed hopper 9 and is disposed upwardly of the cylinder 2 which initially acts upon the vines in such relation thereto that it forms the upper bounding surface of a space across which the vines may freely travel when propelled toward said baffle by the beaters of the initial cylinder. The other baffle associated with the initial beater cylinder, namely the baffle 19, is disposed rearwardly of the baffle 18 and extends downwardly below the latter in spaced relation to said initial cylinder, its lower end being positioned vertically above and in spaced relation to the second cylinder so that vines may pass between it and said second cylinder.

The baffle 20, which extends rearwardly from the lower end of the baffle 19, is related and functions with respect to the second beater cylinder 20 in the same way that the baffle 18 is related and functions with respect to the initial cylinder, while the baffle 21 corresponds to the baffle 19 and is combined with the second cylinder in the same manner as said baffle 18 is combined with the initial cylinder. The lower end of the baffle 21 terminates in upwardly spaced relation to an elevator 26 which is preferably employed to transport the vines from one set of beater cylinders to the next succeeding set of cylinders when more than one set are embodied in the viner.

Each of the baffles may be advantageously provided on the face against which the vines impinge with rounded projections to facilitate the opening of the pods, such projections being preferably in the form of curved metallic ribs 27 riveted or otherwise conveniently secured to the baffles in parallel relation.

The several baffles are preferably adjustable so that their positions may be accommodated to the requirements of different varieties of peas and their state as to maturity and luxuriance of growth of the vines. Accordingly, each of the baffles may be hinged, as indicated at 28, the baffles 18 and 22 being hinged at their forward ends to the adjustable rear walls of their respectively adjacent feed hoppers 9 and 29, and the baffles 20 and 24 being respectively hinged to the lower ends of the upright baffles 19 and 23, while the upright baffles 21 and 25 are hinged at their lower ends to the side walls of the viner. The hinges 28 may conveniently be formed as bolts or rods which form floating pivots, those for the upright baffles 21 and 25 extending through vertical and horizontal slots 30 and 31, respectively, in the viner housing (see Figures 8 and 9) and being provided at their outer ends with suitable nuts for securing them to the viner housing. Rearwardly of its hinge each of the horizontal baffles 18, 20, 22 and 24 is provided on its rear face (see Figures 8 and 9) with one or more brackets 32 providing elongated loops or slots for receiving headed bolts 33 which extend through vertical slots 34 in the side walls of the viner housing and are rigidly secured by nuts 35. The rear walls of the feed hoppers 9 and 29 and the vertical baffles 19, 21, 23 and 25 are similarly equipped on their rear faces with brackets 32 cooperating with bolts 33 which extend through horizontal slots 36 in the side walls of the housing and are provided with securing wing-nuts 35. By these means the baffles 18, 20, 22 and 24 may be slightly inclined either above or below their normal horizontal positions, while the baffles 19, 21, 23 and 25 may be inclined either forwardly or rearwardly with respect to their normal vertical positions; and, moreover, all the baffles may be shifted both horizontally and vertically with respect to the beater cylinders 2 to provide appropriate space for passage of the vines.

If it should be desired to change the inclination of the impact faces of the beaters 3 this may be readily accomplished, as illustrated in Figure 6, by respectively applying to the forward faces 4 of the beaters suitably formed face plates 4a, said plates being preferably backed by fillers 4b.

To provide means for separating chaff from loose peas an inclined shaking screen belt 37 whose upper segment travels downwardly is positioned beneath the first set of beater cylinders 2. Underlying and spaced downwardly from this screen belt is another inclined shaking screen belt 38 which extends rearwardly beyond the screen 37 and whose upper segment likewise travels downwardly. The travel of the lower screen belt 38 is preferably considerably slower than that of the upper screen belt 37 and its mesh is slightly finer than that of the one above it so as to enable it to take out pieces of pods, stems or other chaff which may have passed through the upper screen. Both screen belts are of a width substantially corresponding to the length of the beater cylinders they underlie.

These screen belts 37 and 38, which are primarily intended merely to remove chaff, may be made of wire. They have an up and down or tossing movement communicated to them by reason of the polygonal form of the portions of the shafts or rollers around which they pass, the portions of the driving rollers 39 and 40 which engage the respective screens preferably being square in cross section, and the screen engaging portions of the rollers 41 and 42 which are driven by said screens being preferably hexagonal.

Below the screen belt 38 is a horizontally disposed transversely extending conveyer belt or apron 43 for receiving the peas and any bits of chaff which pass through said screen and delivering them to a pea box (not shown) at the side of the apparatus. It preferably is of rubber and passes around cylindrical rollers.

The elevator 26 for carrying the vines upwardly from the first set of beater cylinders to the feed hopper 29 of the second set of beater cylinders 2 may be of the well known form embodying transversely extending spaced slats or bars 44 secured to endless chains 45 which pass around suitable sprockets carried by the respective shafts 46 and 47 of the elevator, said slats or bars 44 being supported by and moving along the upper surface of an inclined base or bottom board 48 which is slotted at its lower end, as indicated at 49, to permit the escape of loose peas. Underlying the slotted portion of the bottom 48 of this elevator is an inclined guide 50 forming a surface down which peas may roll to the screen belt 38.

Below the second set of rotating beater cylinders 2 is a conveyer or travelling apron 51 which may be in all respects like the belt conveyer 43 associated with the first set of cylinders. Inclined boards 52 and 53, respectively, which in effect form a hopper, permit peas coming from the last set of cylinders to be delivered to the conveyer 51. An inclined chute board 54 having a slotted portion 55 for the escape of peas extends from the outside of the viner to a point closely adjacent the periphery of the last beater cylinder 2 so that the vines may pass out of the viner after having been acted upon by the last beater cylinder and its associated baffles, an opening 56 being provided in the guide board 53 to permit the passage of such vines or straw.

The beater cylinders and other movable parts of the viner may be conveniently driven from the crank shaft 57 of the internal combustion engine 1 in the following manner: A driving chain 58 passes from a sprocket on the engine shaft 57 around a sprocket 59 that is secured to the shaft 8 of the second beater cylinder 2 of the first set of cylinders, thus driving said cylinder. The initial cylinder of the first set is driven from its adjacent cylinder by a chain 60 passing around a sprocket 61 mounted on the shaft of said adjacent cylinder and around a sprocket 62 secured to the shaft of said initial cylinder. In a similar manner the last beater cylinder 2 of the second set is driven from the engine shaft by a chain 63, and the initial cylinder of said second set is driven from the shaft of its companion cylinder by a chain 64.

The remaining movable elements of the apparatus are operated from a countershaft 65 which is mounted on the top of the apparatus and is driven by a chain 66 passing from a sprocket on the shaft of the first beater cylinder around a larger sprocket wheel 67 secured to the countershaft. The feed elevator 10 is driven from the countershaft 65 by a chain 68 which passes from a sprocket on said shaft to a sprocket wheel 69 carried by the shaft 14 at the upper end of said elevator. The elevator 26 which conveys the vines from the first to the second set of beater cylinders is driven by a chain 70 which passes around a sprocket on the countershaft 65 and around a sprocket on the upper shaft 46 of the elevator.

The shaft 39 of the screen belt 37 is provided with a large sprocket 71 which is driven by a chain 72 passing around a smaller sprocket secured to the countershaft 65. Secured to the end of the screen shaft 39 opposite that on which the sprocket wheel 71 is mounted is a sprocket 73 which by means of a chain 74 passing around a sprocket carried by the shaft 40 of the lower screen belt 38 operates the latter.

The belt conveyers 43 and 51, respectively, are preferably driven from a longitudinally extending shaft 75 which is itself driven by a bevel gear 76 which meshes with a bevel gear 77 secured to the shaft 40 of the lower screen belt 38. The belt conveyer 43 is driven from the shaft 75 through suitable sprockets and a chain 78, while the conveyer 51 is similarly driven from said shaft by sprockets around which a chain 79 passes.

The mechanism by which the beater cylinders 2 are driven is preferably such that the peripheral speed of the tips of the beaters increases from cylinder to cylinder from the feed end towards the discharge end of the apparatus. This enables the initial cylinder to be rotated at such speed that its beaters do not injure the tender, succulent peas, which are more easily freed from the pods, and enables the remaining beater cylinders to impinge upon the vines with greater force proportional to the toughness or maturity of the pods. Instead of providing for successive increases in the peripheral speed of the beater tips by appropriately varying the diameters of their respective beater cylinders 2 while rotating them at equal speeds, it is preferred, as illustrated in the drawings, to have all of the beater cylinders of the same diameter and to provide driving mechanism which causes them to rotate at the desired speeds. While the speed at which the beater cylinders rotate is to some extent governed by the condition of the vines, satisfactory results have been obtained under average conditions with beater cylinders of eighteen inches in diameter by rotating the initial cylinder at four hundred (400) revolutions per minute and rotating the next succeeding cylinder at four hundred and fifty (450) revolutions per minute, with proportional increases in the speed of the remaining cylinders, the peripheries of companion cylinders being separated about ten inches to permit the ready escape of loose peas.

The modified form of viner illustrated in Figure 10 is substantially identical with the structure heretofore described, except that it employs three sets of beater cylinders 2 instead of two sets and therefore necessarily employs an additional elevator 26. Its principal parts are identified by reference numerals heretofore applied to corresponding features of construction.

In the operation of the apparatus the vines, which may be immediately received from the means by which they are mowed, are carried upwardly by the feed elevator 10 and delivered to the feed hopper 9, the speed of the elevator being such as to deliver the vines to the hopper in a rather loose bed which is preferably some six or eight inches thick and substantially the width of the viner. As the vines are delivered downwardly by gravity from the lower end of the feed hopper they come into contact with the beaters 4 of the initial beater cylinder 2 of the first set of cylinders. By reason of the high rate of speed of this initial cylinder, the outer ends of its beaters 4 impinge the vines to impart a flicking effect thereto and propel them outwardly beyond the periphery of the cylinder. A large proportion of the tender peas are freed from the pods by this flicking action of the initial cylinder and by the pods coming in contact with the baffles 18 and 19 which deflect the vines toward the next succeeding cylinder, which latter, together with its associated baffles 20 and 21, respectively, acts upon the vines in a similar manner. As will be appreciated, the flicking imparted to the vines by the beaters, in conjunction with the action of gravity, causes the vines to travel in a continuous stream.

Upon leaving the first set of beater cylinders 2 the vines are carried upwardly by the elevator 26 and delivered into the feed hopper 29 associated with the initial beater cylinder 2 of the second set of cylinders, the speed of the elevator 26 preferably being such that the bed of vines carried by it is thinner than that delivered to the feed hopper 9 by the feed elevator 10. The second set of beater cylinders and their cooperating baffles 22, 23, 24 and 25, respectively, act upon the vines in the same manner as heretofore described in respect to the first set of cylinders.

The space between the peripheries of the beater cylinders 2 of the first set is made sufficiently wide to enable peas which have been freed from their pods by the action of the initial cylinder and its associated baffles to pass readily downward to the upper segment of the screen belt 37. This screen belt delivers pieces of pods, vines and the like to the elevator 10, while the peas pass therethrough and fall upon the screen belt 38, through which they pass to the conveyer belt 43. Peas freed from their pods by the action of the last beater cylinder 2 of the first set of cylinders fall upon the loose bed of vines carried by the elevator 26 or pass between the said elevator and cylinder to the lower screen 38. Loose peas falling upon the vines carried by the elevator 26 escape through the slots 49 in the bottom board 48 of the elevator and roll down the inclined guide board 50 to the lower screen belt 38 through which they pass to the conveyer belt 43.

The peas freed from their pods by the second set of beater cylinders 2 roll down the inclined boards 52 and 53, respectively, and are deposited upon the conveyor 51, those which reach the board 52 passing downwardly between the cylinders and those falling upon the board 53 passing downwardly through the slotted portion 55 of the delivery board 54. As the vines delivered from the final beater cylinder 2 pass over the inclined delivery board 54, any remaining loose peas carried by the vines may pass through the slotted portion 55 of said board and reach the upper surface of the neighboring belt conveyer 51. As is usual a pea box (not shown) is associated with each of the conveyers 43 and 51, respectively.

While the apparatus illustrated in the drawings embodies the best form in which it is contemplated applying the principle of the invention, it is evident that many changes may be made in details of construction and in the arrangement of parts without departing from the spirit of the invention and the scope of the claims.

Having thus described the invention, what is claimed is:

1. A viner for threshing peas and beans embodying a plurality of substantially parallel beater cylinders for successively acting upon the vines, said cylinders being spaced at their peripheries and having their axes of rotation spaced horizontally and being so positioned that the initial cylinder extends upwardly beyond the next succeeding cylinder, each cylinder being provided with a plurality of beaters extending lengthwise of the respective cylinders for a distance substantially coextensive with the portion thereof that is in the path of the vines, means for feeding the vines downwardly to the initial cylinder at substantially the uppermost portion thereof, means for rotating said cylinders in the same direction, said direction of rotation being such as to induce the initial cylinder to force the vines outwardly beyond its periphery through an upper arc thereof which is adjacent that portion of said initial cylinder to which the vines are fed by said vine feeding means, and baffle means located adjacent said upper arc for cooperating with the vines, said baffle means having a surface extending rearwardly substantially from the point at which the vines are fed to the initial cylinder and adapted to be impinged by the vines, said surface being disposed upwardly of the initial cylinder in such relation thereto as to constitute the upper boundary of an unobstructed space across which the vines may freely travel when propelled toward said surface from said initial cylinder.

2. A viner for threshing peas and beans embodying a plurality of beater cylinders for successively acting upon said vines, said cylinders being rotatable on substantially horizontal independent axes and being spaced in a radial direction at adjacent portions of their peripheries and the initial cylinder being so disposed that it extends upwardly beyond the next succeeding cylinder, each cylinder being provided with a plurality of beaters extending lengthwise of the respective cylinders for a distance substantially coextensive with the portion thereof that is in the path of the vines, means for feeding the vines downwardly to the initial cylinder at substantially the uppermost portion thereof, means for rotating said cylinders, means for causing vines acted on by said initial cylinder to be delivered downwardly to the next succeeding cylinder, said last named means embodying baffle means having a downwardly facing surface extending rearwardly substantially from the point at which the vines are fed to the initial cylinder and adapted to be impinged by the vines, said surface being disposed upwardly of the initial cylinder in such relation thereto as to constitute the upper boundary of an unobstructed space across which the vines may freely travel when propelled toward said surface from said initial cylinder, and baffle means spaced from said succeeding cylinder and adapted to be impinged by vines propelled from said succeeding cylinder.

3. A viner for threshing peas and beans embodying a plurality of substantially parallel beater cylinders for successively acting upon said vines, the initial cylinder extending upwardly beyond the next succeeding cylinder and said cylinders having their axes of rotation disposed substantially horizontal and in spaced relation and having their respective peripheries separated from each other radially to afford a space for the downward passage of peas and beans, each of said cylinders being provided with a plurality of beaters extending lengthwise of the respective cylinders for a distance substantially coextensive with the portion of the cylinder that is in the path of the vines, means for feeding the vines downwardly to the upper portion of the initial cylinder, means for rotating said cylinders, means for causing vines acted on by said initial cylinder to be delivered downwardly to the next succeeding cylinder, said last named means embodying baffle means having a plurality of surfaces disposed at an angle to each other and adapted to be impinged by the vines, one of said surfaces extending rearwardly substantially from the point at which the vines are fed to the initial cylinder and being disposed upwardly of the initial cylinder in such relation thereto as to constitute the upper boundary of a space across which vines propelled from said initial cylinder may travel, and the other of said surfaces having its lower end positioned vertically above and in spaced relation to said succeeding cylinder, and baffle means spaced from said succeeding cylinder and adapted to be impinged by vines propelled therefrom.

4. A viner for threshing peas and beans embodying a plurality of beater cylinders for successively acting upon said vines, the respective peripheries of said cylinders being separated from each other radially to afford a space for the downward passage of peas and beans and each of said cylinders being provided with a plurality of beaters extending lengthwise of the respective cylinders for a distance substantially coextensive with the portion of the cylinder that is in the path of the vines, means for rotating said cylinders, means for feeding the vines downwardly to the upper portion of the initial cylinder, baffle means adapted to be impinged by vines propelled from the initial cylinder, and baffle means adapted to be impinged by vines propelled from the next succeeding cylinder, each of said baffle means embodying a downwardly facing baffle surface spaced upwardly from the adjacent cylinder and extending rearwardly substantially from the point at which the vines are fed to said adjacent cylinder, and each of said baffle means also embodying a baffle surface positioned rearwardly of the aforesaid baffle surface and extending downwardly with respect thereto rearwardly of and in spaced relation to the said beater cylinder which immediately precedes it.

5. A viner for threshing peas and beans embodying a plurality of substantially parallel beater cylinders for successively acting upon the vines, the initial cylinder extending upwardly beyond the next succeeding cylinder and said cylinders having their peripheries separated radially to afford a space for the downward passage of peas and beans and having their axes of rotation disposed substantially horizontal and in spaced relation, each of said cylinders being provided with a plurality of beaters extending lengthwise of the respective cylinders for a distance substantially coextensive with the portion of the cylinder which is in the path of the vines, the forward faces of said beaters being raked backwardly with respect to their direction of rotation, means for rotating said cylinders in the same direction, means for feeding the vines downwardly to the initial cylinder at substantially the uppermost portion thereof, baffle means respectively associated with each of said cylinders and adapted to be impinged by vines propelled therefrom, each of said baffle means including a plurality of baffle surfaces extending at an angle to each other and spaced from the cylinder from which they receive the vines, one of said surfaces of each of said baffle means facing downwardly with respect to the cylinder with which it is operatively associated and being disposed rearwardly of the point at which the vines are fed to said last named cylinder, and one of said surfaces of each of said baffle means being positioned rearwardly of said downwardly facing surface adjacent thereto and extending downwardly below the latter.

6. A viner for threshing peas and beans embodying a plurality of rotatable beater cylinders for successively acting upon the vines, said cylinders being disposed with their axes of rotation substantially horizontal and each being provided with beaters extending lengthwise of the respective cylinders for a distance substantially coextensive with the portion thereof that is in the path of the vines, means for rotating said beater cylinders, the initial one of said cylinders being caused to rotate in a direction such that the beaters thereof respectively pass through their highest position when rotating toward the next succeeding beater cylinder, means for feeding the vines downwardly to the initial cylinder in such relation thereto that the fed vines may be impinged by the respective beaters thereof as said beaters rotate through an upper arc of their travel, means for causing vines leaving said initial cylinder to be delivered downwardly to the next succeeding cylinder in such relation thereto that said vines may be impinged by the beaters of said succeeding cylinder as they respectively rotate through an upper arc of their travel, said last named means involving baffle means disposed upwardly of the plane passing through the respective axes of the initial cylinder and next succeeding cylinder and spaced outwardly from and facing toward an arc of the initial cylinder through which the beaters thereof pass when rotating toward said plane from the point at which the vines are fed to said initial cylinder to thus provide a space between said baffle means and the inital cylinder across which vines may freely travel when thrown toward said baffle means from said initial cylinder at said arc, and baffle means spaced outwardly from said succeeding beater cylinder in position to be struck by vines thrown from the periphery thereof.

7. A viner for threshing peas and beans embodying a plurality of spaced beater cylinders for successively acting upon the vines, said cylinders being rotatable on substantially horizontal independent axes and each being provided with a plurality of beaters extending lengthwise of their respective cylinders for a distance substantially coextensive with the portion thereof that is in the path of the vines, means for rotating said cylinders, means for feeding the vines downwardly to one of said cylinders, a plurality of downwardly facing baffles respectively associated with said cylinders and spaced upwardly therefrom, and a movable elevator acting to convey vines from one of said cylinders to the next succeeding cylinder.

8. A viner for threshing peas and beans embodying beater cylinders for successively acting upon said vines, said cylinders being rotatable on substantially horizontal independent axes and being spaced in a radial direction at adjacent portions of their peripheries and the initial cylinder being so disposed that it extends upwardly beyond the next succeeding cylinder, each cylinder being provided with a plurality of beaters extending lengthwise thereof for a distance substantially coextensive with the portion of the respective cylinder that is in the path of the vines, means for feeding the vines downwardly to the initial cylinder in such relation thereto that the fed vines may be impinged by the beaters thereof as said beaters rotate through an upper arc of their travel, means for rotating said cylinders in the same direction, said direction of rotation being such as to induce the respective cylinders to force the vines outwardly beyond their peripheries, a plurality of baffles respectively associated with said cylinders and spaced therefrom, and means extending under said cylinders for separating chaff from loose peas.

9. A viner for threshing peas and beans embodying a plurality of rotatable beater cylinders for successively acting upon the vines, said cylinders having their axes of rotation substantially horizontal and having their peripheries separated radially to provide a space for the downward passage of loose peas and beans, each of said cylinders being provided with a plurality of beaters extending lengthwise of the respective cylinders for a distance substantially coextensive with the portion of the cylinder which is in the path of the vines, means for feeding the vines downwardly to the initial cylinder, baffle means respectively associated with each of said cylinders and adapted to be impinged by vines propelled therefrom, and means for rotating said cylinders at different peripheral speeds, the peripheral speed of said initial cylinder being less than the peripheral speed of the next succeeding cylinder.

FRANCIS J. BOTT.